United States Patent
Harada

(10) Patent No.: US 11,415,214 B2
(45) Date of Patent: Aug. 16, 2022

(54) SHIFT OPERATION DETERMINATION APPARATUS AND SHIFT APPARATUS

(71) Applicant: HONDA MOTOR CO., LTD., Tokyo (JP)

(72) Inventor: Kenichi Harada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/197,566

(22) Filed: Mar. 10, 2021

(65) Prior Publication Data

US 2021/0293329 A1 Sep. 23, 2021

(30) Foreign Application Priority Data

Mar. 19, 2020 (JP) .............................. JP2020-048635

(51) Int. Cl.
| | |
|---|---|
| *F16H 59/08* | (2006.01) |
| *F16H 59/54* | (2006.01) |
| *F16H 61/16* | (2006.01) |
| *F16H 61/22* | (2006.01) |
| *F16H 61/18* | (2006.01) |
| *F16H 59/48* | (2006.01) |

(52) U.S. Cl.
CPC .............. *F16H 59/08* (2013.01); *F16H 59/54* (2013.01); *F16H 61/16* (2013.01); *F16H 61/18* (2013.01); *F16H 61/22* (2013.01); *F16H 59/48* (2013.01); *F16H 2059/081* (2013.01)

(58) Field of Classification Search
CPC .... F16H 59/08; F16H 59/54; F16H 2059/081; F16H 61/16; F16H 61/18; F16H 61/22
See application file for complete search history.

(56) References Cited

U.S. PATENT DOCUMENTS

| | | | |
|---|---|---|---|
| 8,359,943 B2 * | 1/2013 | Seki ........................ | F16H 61/22 74/473.21 |
| 9,021,913 B2 * | 5/2015 | Kamoshida ............. | F16H 61/18 74/473.3 |
| 2013/0047768 A1 | 2/2013 | Kamoshida et al. | |

FOREIGN PATENT DOCUMENTS

JP          2013-47074 A          3/2013

OTHER PUBLICATIONS

Chinese Office Action with English translation dated Apr. 6, 2022, 17 pages.

* cited by examiner

*Primary Examiner* — Huan Le
(74) *Attorney, Agent, or Firm* — Rankin, Hill & Clark LLP

(57) ABSTRACT

A shift operation determination apparatus includes: an operation member rotatably attached to the vehicle; a position detection section configured to detect a position of the operation member in a rotation direction; a shift determination section configured to determine, based on the position of the operation member, a shift range selected by the operation member; and a regulation section configured to regulate a rotation of the operation member, the regulation section being configured to regulate the rotation of the operation member when the operation member moves to a second position corresponding to the second range from a first position corresponding to the first range or a third position corresponding to the third range and moves to the third position within a predetermined time after being located at the second position.

6 Claims, 8 Drawing Sheets

SHIFT OPERATION DETERMINATION APPARATUS AND SHIFT APPARATUS

INCORPORATION BY REFERENCE

The present application claims priority under 35 U.S.C. § 119 to Japanese Patent Application No. 2020-048635 filed on Mar. 19, 2020. The content of the application is incorporated herein by reference in its entirety.

BACKGROUND OF THE INVENTION

Field of the Invention

The present invention relates to a shift operation determination apparatus and a shift apparatus.

Description of the Related Art

In the related art, as a shift apparatus of a vehicle, a lever-shaped shift apparatus using a shift lever and a dial-shaped shift apparatus using a shift knob have been known. Such a shift apparatus has a P (parking) range selected during parking of the vehicle, and a plurality of shift ranges including an R (reverse), an N (neutral), and a D (drive), and a driver selects the shift range by operating the shift lever and the shift knob. Specifically, the respective shift ranges of P, R, N, D, and S are arranged side by side in the operation range of the operation member such as the shift lever or the shift knob, and the shift range is selected corresponding to a position of the operation member according to the operation of moving the operation member.

In such a shift apparatus, a selection of the shift range may be restricted in a case where the driver moves the operation member excessively. For example, Japanese Patent Laid-Open No. 2013-47074 discloses an example of restricting the number of shift ranges to be switched with one operation in a shift apparatus in which a plurality of switching steps of shift ranges arranged in series are selected according to a rotation of an operation member.

In a configuration disclosed in Japanese Patent Laid-Open No. 2013-47074, when the number of shift ranges to be switched is restricted, the shift range is not switched even when the operation member is continuously rotated. For this reason, the driver may not notice that the switching of the shift range is restricted unless the driver takes an action to visually observe a display panel.

The present invention is to restrict the switching of the shift range of the vehicle, thereby the driver can easily recognize that the switching of the shift range is restricted.

SUMMARY OF THE INVENTION

An aspect of the present invention is to provide a shift operation determination apparatus for a vehicle having a shift mechanism capable of switching a plurality of shift ranges including a first range, a second range, and a third range, the shift operation determination apparatus including: an operation member rotatably attached to the vehicle; a position detection section configured to detect a position of the operation member in a rotation direction; a shift determination section configured to determine, based on the position of the operation member, a shift range selected by the operation member; and a regulation section configured to regulate a rotation of the operation member, the regulation section being configured to regulate the rotation of the operation member when the operation member moves to a second position corresponding to the second range from a first position corresponding to the first range or a third position corresponding to the third range and moves to the third position within a predetermined time after being located at the second position.

In another aspect of the present invention, the shift determination section determines that the selected shift range is the second range when the operation member is continuously located at the second position for the predetermined time or longer, and the regulation section enables the operation member to rotate from the second position to the third position after determination that the operation member moves to the second position and the second range is selected.

In another aspect of the present invention, the regulation section does not regulate the rotation of the operation member when the operation member leaves the second position and moves to the third position within a predetermined time after the operation member moves to the second position and a speed of the operation member moving from the second position to the third position is lower than a set speed.

In another aspect of the present invention, the second range is a shift range in which a driving force in a forward direction of the vehicle is output, and the third range is a shift range in which a driving force in the forward direction of the vehicle is output at a higher deceleration ratio compared with the second range.

In another aspect of the present invention, the shift operation determination apparatus further includes a braking operation detection section configured to detect a braking operation of the vehicle, wherein the regulation section regulates the rotation of the operation member from the first position to the second position when the braking operation is not detected in a state where the first range is selected, and regulates the rotation of the operation member from the second position to the third position without regulating the rotation of the operation member from the first position to the second position when the braking operation is detected in the state where the first range is selected.

In another aspect of the present invention, the operation member is rotatable without a restriction on an amount of rotation in a state of not being regulated by the regulation section.

Another aspect of the present invention is to provide a shift apparatus for a vehicle having a shift mechanism capable of switching a plurality of shift ranges including a first range, a second range, and a third range, the shift apparatus including: a shift operation determination apparatus configured to determine a shift range of the vehicle according to an operation; and a shift control section configured to switch the shift range of the vehicle based on a determination result of the shift operation determination apparatus, the shift operation determination apparatus including: an operation member rotatably attached to the vehicle; a position detection section configured to detect a position of the operation member in a rotation direction; a shift determination section configured to determine, based on the position of the operation member, a shift range selected by the operation member; and a regulation section configured to regulate a rotation of the operation member, the regulation section being configured to regulate the rotation of the operation member when the operation member moves to a second position corresponding to the second range from a first position corresponding to the first range or a third position corresponding to the third range and moves to the third position within a predetermined time after being located at the second position.

According to the aspects of the present invention, an unintentional change in the shift range from the driver can be restricted, and the driver can easily recognize from operation feeling that an operation of changing the shift range is restricted.

DETAILED DESCRIPTION OF THE PREFERRED EMBODIMENT

[1. Overview of Gear Shift of Automobile]

Figure 1:
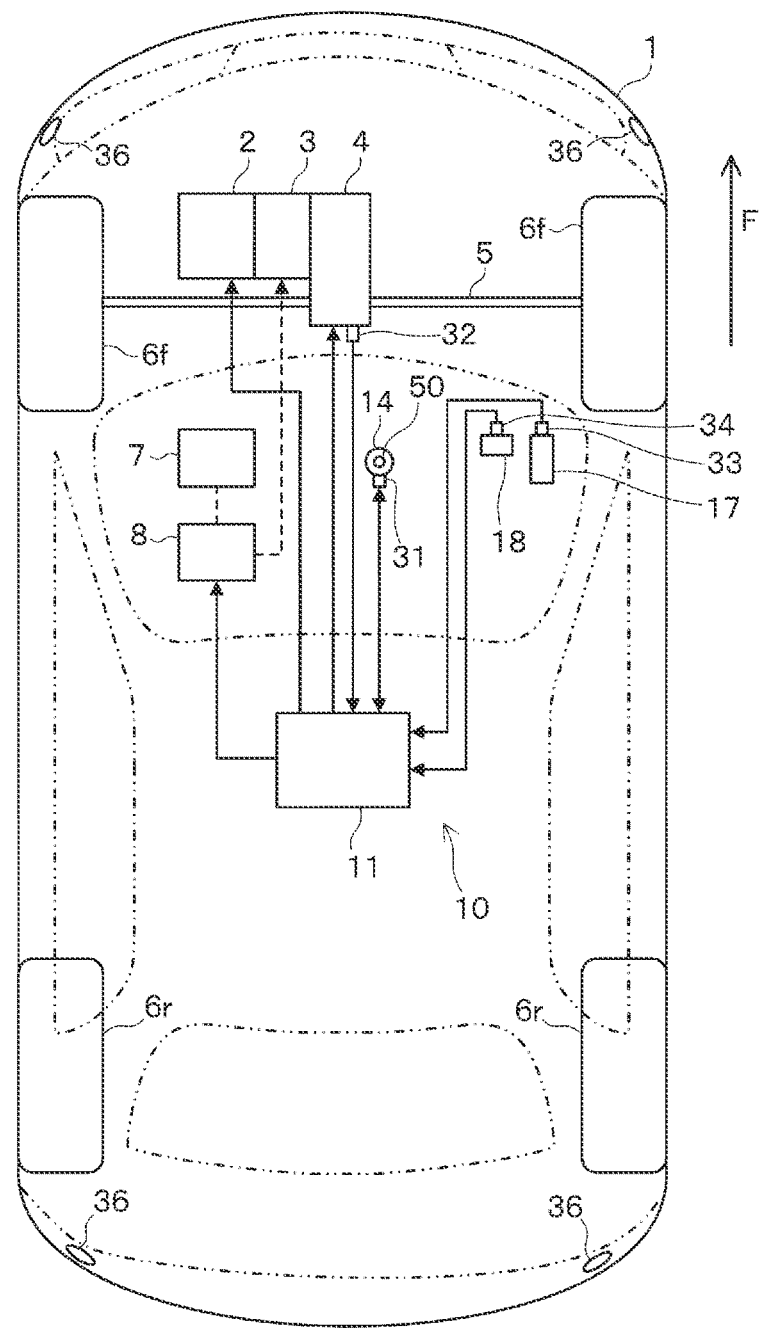
FIG. 1 is a schematic diagram of a drive system of an automobile according to the present embodiment.
Figure 2:
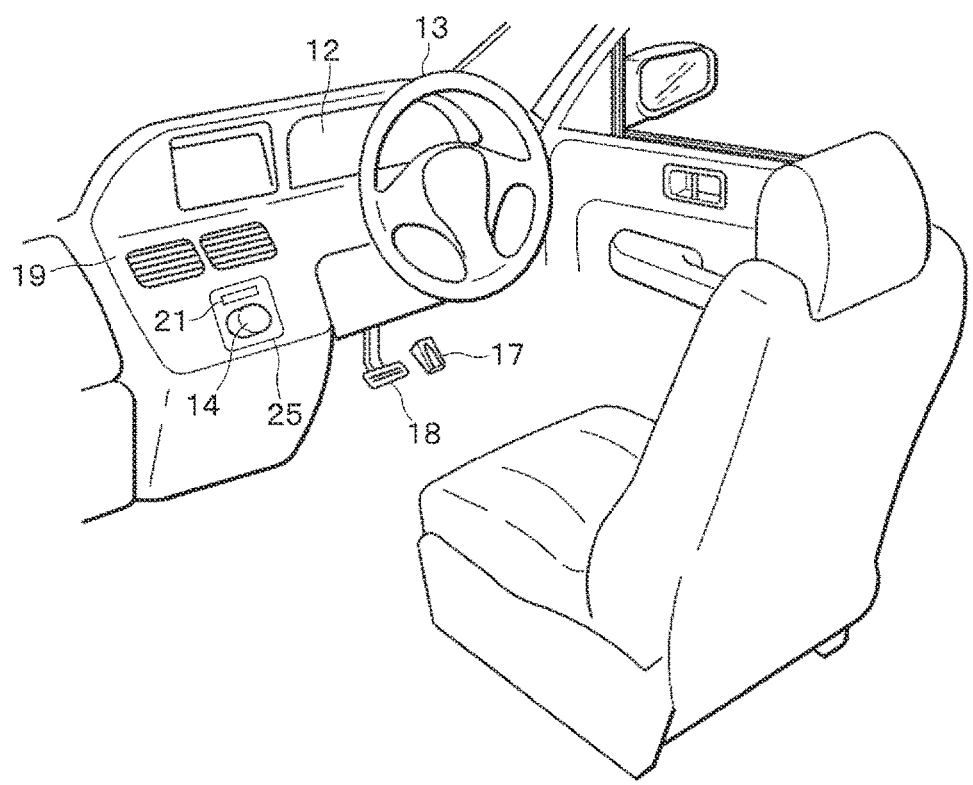
FIG. 2 is a schematic perspective view of a periphery of a driver's seat of the automobile.

FIG. 1 is a schematic diagram of a drive system of an automobile 1 according to an embodiment to which the present invention is applied. FIG. 2 is a schematic perspective view of a periphery of a driver's seat of the automobile 1.

The automobile 1 described in the present embodiment is mounted with an engine 2 as a drive source, and transmits power of the engine 2 to drive wheels through a transmission 4 and a drive shaft 5. In the illustrated example, the automobile 1 is a front-wheel drive vehicle having front wheels 6f as drive wheels, but may be a rear-wheel drive vehicle having rear wheels 6r as drive wheels or a four-wheel drive vehicle having both front and rear wheels 6 as drive wheels. In FIG. 1, reference numeral F indicates a traveling direction when the automobile 1 moves forward.

The transmission 4 mounted on the automobile 1 is an automatic transmission (AT) that automatically shifts gears under control of a control unit 11 to be described below. In the present embodiment, as an example of the transmission 4, a step AT with four forward gears and one reverse gear is described. However, the transmission 4 may be a more multi-gear AT or a continuously variable transmission (CVT). Further, a mechanical configuration of the transmission 4 may be a configuration having a torque converter or a DCT (dual clutch transmission) without being limited. The transmission 4 corresponds to an example of a shift mechanism.

The automobile 1 may be an electric automobile (EV) in which a motor generator 3 is mounted instead of the engine 2 as a drive source. In addition, the automobile 1 may be a hybrid vehicle (HEV) in which the motor generator 3 is mounted together with the engine 2 as the drive source. The motor generator 3 may function not only as an electric motor for vehicle driving but also as a regenerative generator. An inverter 8 functions as a regenerative braking means of controlling an electric power supply from a battery 7, which is a secondary battery, and an electric power supply (charging) to the battery 7, and converting and regenerating deceleration energy into electric power during deceleration to generate regenerative braking. The automobile 1 may be mounted with a plurality of motor generators 3. For example, the automobile 1 may be provided with a first motor generator 3 that functions as a starter motor used to start the engine 2 and a generator used to generate electricity by the power of the engine 2 and a second motor generator 3 for vehicle driving.

The automobile 1 includes a control unit 11 configured to control the drive system of the automobile 1. The control unit 11 includes, for example, a processor such as a microcomputer, a ROM (Read Only Memory), a RAM (Random Access Memory), peripheral circuits, input/output interfaces, and various drivers.

The automobile 1 includes an accelerator pedal 17 as an accelerator operation unit configured to accelerate the automobile 1 and a brake pedal 18 as a braking operation unit configured to decelerate the automobile 1. The control unit 11 is connected to a vehicle speed sensor 32 configured to detect a vehicle speed of the automobile 1, an accelerator pedal sensor 33 configured to detect the amount of operation of the accelerator pedal 17, and a brake pedal sensor 34 configured to detect an operation of the brake pedal 18.

The automobile 1 may have a configuration in which the accelerator pedal 17 is mechanically coupled to a throttle apparatus of the engine 2, and may be a vehicle that adopts a so-called drive-by-wire in which the control unit 11 controls the throttle apparatus based on the detection result of the accelerator pedal sensor 33. Further, the automobile 1 may have a configuration in which the brake pedal 18 is mechanically coupled to a braking mechanism of the automobile 1, and may be a vehicle that adopts a so-called brake-by-wire in which the control unit 11 controls the braking mechanism based on the detection result of the brake pedal sensor 34. Further, an accelerator operation unit having a lever shape or another shape may be adopted instead of the accelerator pedal 17, and a brake operation unit may be adopted instead of the brake pedal 18.

The automobile 1 includes a shift apparatus 10 including the control unit 11 as a configuration for controlling the gear shift of the transmission 4. The shift apparatus 10 includes, in addition to the control unit 11, a shift operation member 14 configured to change a shift range of the transmission 4 and an angle detector 31 configured to detect an operation of the shift operation member 14. In addition, the shift apparatus 10 included an electromagnetic brake mechanism 50 configured to restrict the operation of the shift operation member 14. The shift apparatus 10 may include the vehicle speed sensor 32, the accelerator pedal sensor 33, and the brake pedal sensor 34. The shift apparatus 10 corresponds to an example of a shift operation determination apparatus.

The automobile 1 is provided with an obstacle sensor 36. The obstacle sensor 36 is a sensor configured to detect an obstacle around the automobile 1, and includes a sonar sensor configured to detect an object within a predetermined distance from a vehicle body of the automobile 1 using ultrasonic waves, for example. The obstacle sensor 36 may be an optical sensor configured to detect an obstacle using a laser beam, or a device configured to detect an obstacle based on an image captured by a camera. In the automobile 1, as shown in FIG. 1, for example, one obstacle sensor 36 is arranged at each of left and right ends of each front and rear portion of the vehicle body. The obstacle sensor 36 is connected to the control unit 11 by a control line (not shown), and outputs a detection result to the control unit 11. The shift apparatus 10 may include the obstacle sensor 36.

The control unit 11 selects a shift range of the transmission 4 according to the operation of the shift operation member 14 in addition to the drive control of the engine 2, and also performs shift control for changing a gear step of the transmission 4 according to the selected shift range. The gear step is changed by opening and closing of a shift solenoid valve (not shown) provided in a hydraulic circuit connected to the transmission 4. Further, when the automobile 1 is an electric automobile or a hybrid vehicle, the control unit 11 also controls a drive/regeneration of the motor generator 3. Further, the control unit 11 may have a function of controlling a lighting device mounted on the automobile 1 or another function of the automobile 1. A function related to the control of the transmission 4 will be described below.

The shift operation member 14 is a dial-shaped columnar knob, and an operation of rotating the shift operation member 14 is performed by the hand of the driver who drives the automobile 1. The driver can rotate the shift operation member 14 to switch a gear shift mode of the transmission 4 of the automobile 1, that is, the shift range. The shift operation member 14 corresponds to an example of an operation member.

The shift range of the automobile 1 includes a P (parking) range selected during parking of the automobile 1, an R (reverse) range used to retreat the automobile 1, an N (neutral) range which is a state where a driving force is not transmitted from the transmission 4 to the drive shaft 5, and a D (drive) range used to move forward the automobile 1. The transmission 4 may be configured to restrict the rotation of the drive shaft 5 in the P range and not to apply either of the driving force or the braking force to the drive shaft 5 in the N range. Further, the automobile 1 includes one or a plurality of forward shift ranges different from the D range. These types of shift ranges are called a S range, an L range, a D2 range, and a B range, and the transmission 4 of the present embodiment includes an S range as an example. In such a shift range, a deceleration ratio of the drive shaft 5 to the drive shaft of the engine 2 or the motor generator 3 is larger than that in D range. For example, such a shift range is selected for the purpose of giving a drive torque larger than that in the D range to the drive shaft 5 or for the purpose of generating a braking force stronger than that in the D range on the drive shaft 5 by engine braking or regeneration.

The shift operation member 14 is provided on a lower left side of a steering wheel 13 in the instrument panel 19 of the automobile 1. In the instrument panel 19, a portion provided with the shift operation member 14 may protrude as compared with other portions such that the driver can easily operate the shift operation member 14. A position of the shift operation member 14 is not limited to the example of FIG. 2, and may be provided at a center console or at another position.

The shift operation member 14 is unitized together with a display panel 21 configured to display the shift range selected in the automobile 1 to form an operation unit 25.

[2. Configuration of Operation Unit]

Figure 3:
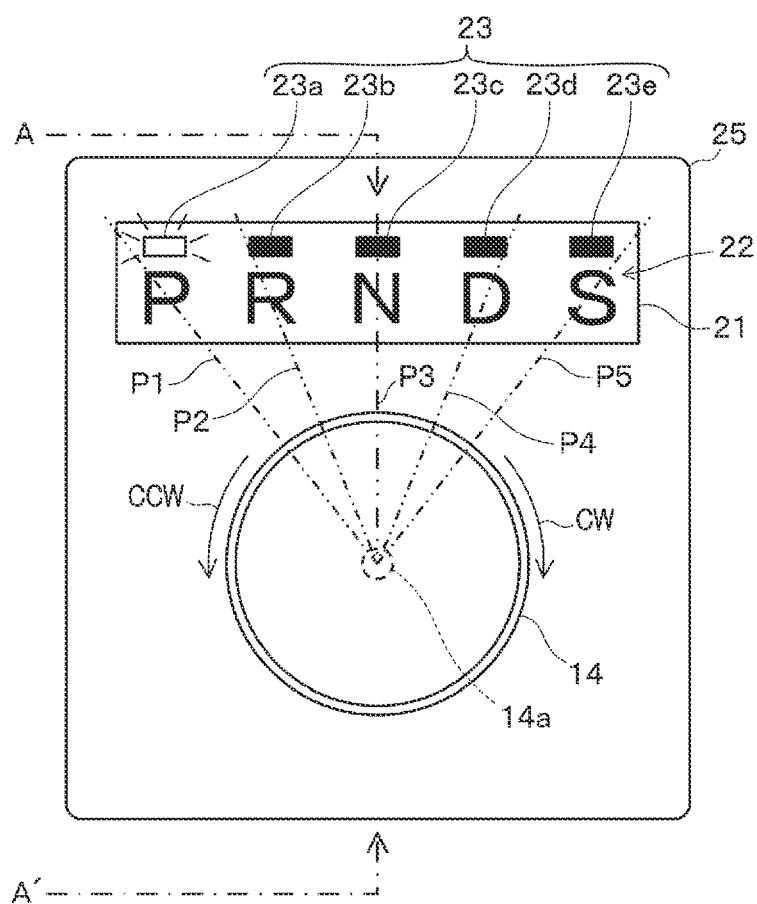
FIG. 3 is a plan view of an operation unit.

FIG. 3 is a plan view of the operation unit 25.

As shown in FIG. 3, the shift operation member 14 can rotate in a clockwise direction (CW in the drawing) and a counterclockwise direction (CCW in the drawing). In the operation unit 25, the display panel 21 is arranged above the shift operation member 14. On the display panel 21, displays of P, R, N, D, and S, which are the shift ranges of the transmission 4, are sequentially arranged in this order in the CW direction which is a rotation direction of the shift operation member 14.

The driver rotates the shift operation member 14 in the CW direction or the CCW direction to select the shift range of the transmission 4.

On the display panel 21, an indicator 23 is located corresponding to the displays of P, R, N, D, and S of a range display portion 22. The indicator 23 includes indicators 23a, 23b, 23c, 23d, and 23e corresponding to the positions of P, R, N, D, and S of the range display portion 22, respectively. The indicator 23a includes a light source such as an LED, and emits light in a state where the P range is selected as the shift range of the transmission 4. Similarly, each of the indicators 23b, 23c, 23d, and 23e includes a light source such as an LED. The indicator 23b emits light in a state where the R range is selected as the shift range of the transmission 4. The indicator 23c emits light in a state where the N range is selected, the indicator 23d emits light in a state where the D range is selected, and the indicator 23e emits light in a state where the S range is selected. FIG. 3 shows, as an example, a state where the P range is selected and the indicator 23a is emitting light.

In the automobile 1, the meter panel 12 may have the same display as the display panel 21. For example, the meter panel 12 may be arranged with displays of P, R, N, D, and S, which are the shift ranges of the transmission 4, to emit light of the display of the selected shift range.

In the rotation direction of the shift operation member 14, selection positions P1, P2, P3, P4, and P5 are set corresponding to the number of shift ranges of the transmission 4. The shift operation member 14 can rotate infinitely in the CW direction and the CCW direction, and is configured to obtain feeling of moderation (click feeling) at a constant angle interval as will be described below. More specifically, a click feeling is obtained for each of the angles corresponding to the selection positions P1, P2, P3, P4, and P5. For example, when the shift operation member 14 is rotated in the CW direction in the state where the shift range P is selected, a click feeling can be obtained at the selection positions P2, P3, P4, and P5. Further, when the shift operation member 14 is rotated in the CCW direction in the state where the shift range S is selected, a click feeling can be obtained at the selection positions P4, P3, P3, and P2. Thus, the shift operation member 14 can be easily rotated step by step corresponding to the displays of P, R, N, D, and S of the range display portion 22, and the operability of the operation of selecting the shift range is improved.

A relative position between the shift operation member 14 and each of the selection positions P1 to P5 is not fixed. The shift operation member 14 can be rotated in the CCW direction from the selection position P1, and can be rotated in the CW direction from the selection position P5. In this case, the selected shift range is the P range or the S range, and is not changed.

FIG. 3 shows an example of the configuration, and the automobile 1 may have a configuration in which the shift range of the transmission 4 can be selected from six steps of P, R, N, D, S, and L. Further, the automobile 1 may have a configuration in which the S range or the L range is not provided. In such a case, the number of indicators 23 and the number of selection positions may be appropriately changed according to the number of shift ranges selected by the operation of the shift operation member 14. In addition, the arrangement of the shift ranges in the range display portion 22 is not limited to the example of FIG. 3. For example, the displays of the shift ranges can be arranged clockwise instead of counterclockwise, and the B range can be arranged instead of the L range.

Figure 4:
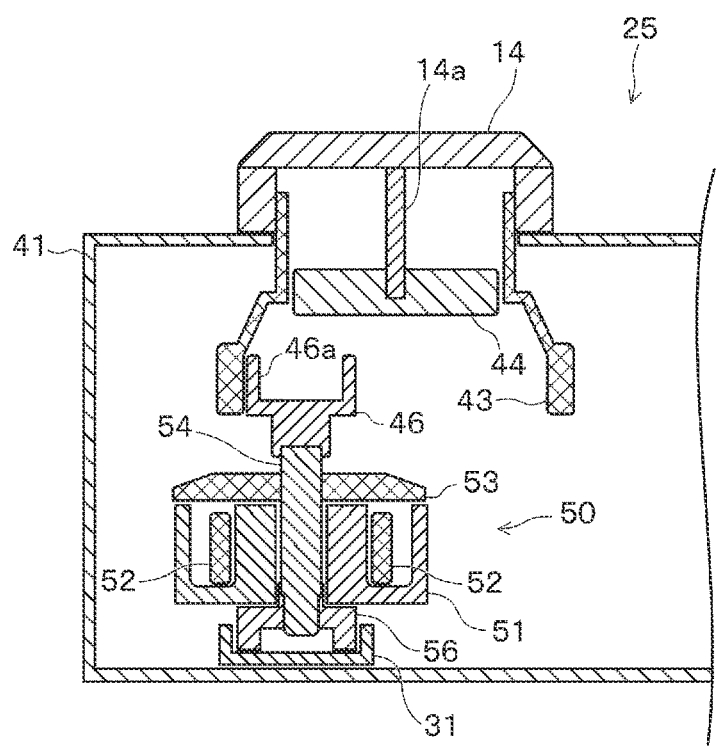
FIG. 4 is a cross-sectional view of a main portion of the operation unit.

FIG. 4 is a cross-sectional view of a main portion of the operation unit 25, and shows a main portion of the cross section A-A' in FIG. 3.

The shift operation member 14 is arranged on an upper surface of a case 41 of the operation unit 25. The case 41 houses an operation load generator 44, an overdrive mechanism 46, an electromagnetic brake mechanism 50, and an angle detector 31 (angle detection sensor).

The shift operation member 14 includes a shaft 14a which is a rotating center, and the shaft 14a is supported by the operation load generator 44.

The operation load generator 44 includes, for example, cams formed at predetermined angles in the rotation direction of the shift operation member 14 and rollers that slide with the cams. The operation load generator 44 rotatably supports the shaft 14a, and generates resistance to the rotation of the shaft 14a at each angle corresponding to the cam position in the rotation direction of the shaft 14a. Thus, a click feeling is generated for the operation of rotating the shift operation member 14.

When the rotating amount of the shift operation member 14 is less than the minimum operation angle, the rollers move in a reverse direction along the cams, and thus the operation load generator 44 has an operation of returning the shift operation member 14 to the position before rotation. Therefore, when the rotating amount of the shift operation member 14 to be rotated by the driver is small, the shift operation member 14 returns to the position before rotation, so that, for example, it is possible to prevent the driver from unintentionally switching the shift range. The minimum operation angle is half of the predetermined angle, for example.

A gear 43 is fixed to the shift operation member 14. The gear 43 rotates around the shaft 14a together with the shift operation member 14.

The overdrive mechanism 46 includes a small-diameter gear 46a that engages with the gear 43, and is connected to a shaft 54. The overdrive mechanism 46 increases a rotational speed of the gear 43 with an overdrive ratio according to a ratio between the number of teeth of the gear 43 and the number of teeth of the gear 46a and transmits the rotational speed to the shaft 54.

The electromagnetic brake mechanism 50 is an example of a regulation mechanism that regulates the rotation of the shift operation member 14, and forms a regulation unit together with a lock control section 114 to be described below. The electromagnetic brake mechanism 50 includes a cylindrical yoke 51, a coil 52 arranged inside the yoke 51, and an armature 53. The coil 52 is connected to the control unit 11, and a current application to the coil 52 is switched to be ON and OFF by the control of the control unit 11.

The armature 53 is coupled to a lower part of the shaft 54 and is rotatable with the shaft 54.

In a state where the current is not applied to the coil 52, the armature 53 is rotatably supported together with the shaft 54. In such a state, the armature 53 rotates as the shift operation member 14 rotates.

When the current is applied to the coil 52, the yoke 51 is magnetized, and the rotation of the armature 53 is regulated by a magnetic force of the yoke 51. Therefore, the rotation of the shaft 54 is regulated, and the rotation of the shift operation member 14 is prevented. In other words, the shift operation member 14 is locked so as not to rotate. When the current application to the coil 52 is turned off, the lock of the shift operation member 14 is released.

A to-be-detected object 56 is coupled to a lower end of the shaft 54. The to-be-detected object 56 is located inside the angle detector 31, and rotates together with the overdrive mechanism 46 and the shaft 54. The angle detector 31 is a sensor configured to detect a rotating amount of the to-be-detected object 56, and corresponds to an example of a position detection unit. The angle detector 31 outputs a detection result of the rotating amount of the to-be-detected object 56 to the control unit 11. The control unit 11 can detect a rotation angle of the shift operation member 14 by performing an arithmetic operation based on the detection result of the angle detector 31 and the overdrive ratio of the overdrive mechanism 46.

The electromagnetic brake mechanism 50 electromagnetically regulates the rotation of the armature 53. For this reason, the current flowing through the coil 52 can be adjusted, and thus a slight rotation of the armature 53 can be allowed during the current application to the coil 52. In this case, when the driver applies an operating force in the CW direction or the CCW direction to the shift operation member 14 during the current application to the coil 52, the shift operation member 14 slightly rotates due to the operating force. When such an operating force is released, the shift operation member 14 is returned to the position before rotation due to the action of the operation load generator 44.

When the operating force is applied to the shift operation member 14 during the current application to the coil 52 and when the operating force is released, the movement of the shift operation member 14 can be detected by the angle detector 31. Therefore, the control unit 11 can detect, based on the detection result of the angle detector 31, the application of the operating force to the shift operation member 14 while the rotation of the electromagnetic brake mechanism 50 is regulated and the release of the operating force. For example, the control unit 11 stops the current application to the coil 52 when detecting the release of the operating force applied to the shift operation member 14 during the current application to the coil 52.

The configuration shown in FIG. 4 is an example. For example, the operation load generator 44 may employ a known detent mechanism. Further, the angle detector 31 may be configured to magnetically detect the rotating amount of the to-be-detected object 56 rotating amount, or may be configured to detect using an optical sensor, and other detection methods may be employed. In addition, the operating force applied to the shift operation member 14 while the electromagnetic brake mechanism 50 regulates the rotation of the shift operation member 14 may be detected using, for example, a piezoelectric element, or may be detected by other sensors.

[3. Configuration of Control Unit]

Figure 5:
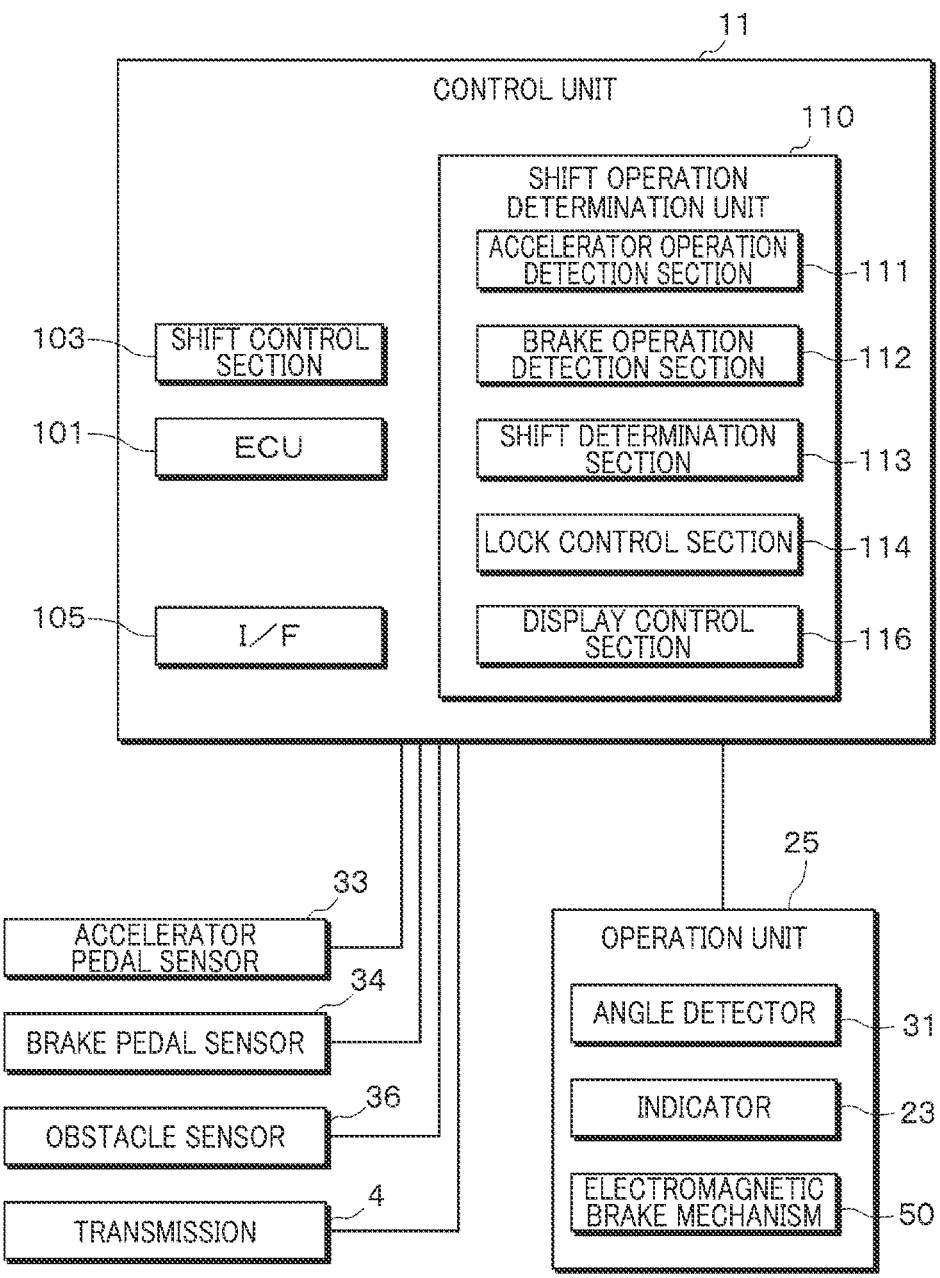
FIG. 5 is a block diagram of a control system of the automobile.

FIG. 5 is a block diagram of a control system of the automobile 1.

The control unit 11 configured to control the automobile 1 comprises an ECU 101, a shift control section 103, an interface 105, and a shift operation determination unit 110.

The shift operation determination unit 110 comprises a brake operation detection section 112, a shift determination section 113, a lock control section 114, and a display control section 116. Further, the shift operation determination unit 110 may include an accelerator operation detection section 111. Each of the functional sections in the control unit 11 may be configured by independent hardware, or the plurality of functional sections may be configured by one hardware. For example, a function of each of the sections of the shift operation determination unit 110 may be realized by execution of a program by a processor.

As described above, the ECU 101 controls, based on the detection results of the accelerator pedal sensor 33 and the brake pedal sensor 34, the engine 2 and the inverter 8 to cause the automobile 1 to travel.

The shift operation determination unit 110 detects the operations of the shift operation member 14 and the brake pedal 18 to determine the shaft range of the transmission 4 corresponding to the operation of the driver.

The shift control section 103 has a control function of switching the shift range of the transmission 4. When the shift operation determination unit 110 determines the shift range according to the operation of the shift operation member 14, the shift control section 103 switches the shift range of the transmission 4 based on the determination result of the shift operation determination unit 110.

The interface 105 is a circuit configured to exchange various signals and data with an external device of the control unit 11, and is connected to at least the brake pedal sensor 34, the transmission 4, and the operation unit 25. The accelerator pedal sensor 33 and the obstacle sensor 36 may be connected to the interface 105. As shown in FIG. 1, the control unit 11 is connected to the engine 2 and the inverter 8, but is not shown in FIG. 5 for convenience of description.

The accelerator operation detection section 111 detects, based on the detection result of the accelerator pedal sensor 33, the presence or absence of the operation of the accelerator pedal 17 and/or the amount of operation of the accelerator pedal 17.

The brake operation detection section 112 detects, based on the detection result of the brake pedal sensor 34, the presence or absence of the operation of the brake pedal 18 and/or the amount of operation of the brake pedal 18. The brake operation detection section 112 corresponds to an example of a braking operation detection unit.

The shift determination section 113 determines, based on the detection result of the angle detector 31, which of selection positions P1, P2, P3, P4, and P5 the position of the shift operation member 14 corresponds to. The shift determination section 113 lights up the indicator 23 of the determined shift range.

When the shift operation member 14 moves to any one of the selection positions P1, P2, P3, P4, and P5, the shift determination section 113 determines that the shift range of the selection position of the movement destination is selected when the selection position of the movement destination is maintained for a time exceeding a preset predetermined time (for example, 0.2 seconds). The predetermined time as a reference for such determination will be described below as a time T.

The lock control section 114 controls the regulation of the shift operation member 14 by the electromagnetic brake mechanism 50. Specifically, the lock control section 114 performs control such that the current application to the coil 52 is switched to be ON and OFF, and switches from a state where the electromagnetic brake mechanism 50 locks the shift operation member 14 to a state where the lock is released.

Among the shift range switching operations of the automobile 1, there is a restriction on the operation of changing from a certain of the shift range to another shift range. For example, in order to perform an operation of changing from the P range to the shift range other than the P range, the brake pedal 18 needs to be operated. This is a restriction for preventing for the driver from unintentional acceleration, and is a restriction generally provided in the automobile.

Also in the shift apparatus 10 of the present embodiment, the shift operation member 14 can be operated in the state where the P range is selected, on condition that the brake pedal 18 is operated in a state where the shift operation member 14 is not operated. The brake pedal 18 is not operated when the shift range is the P range, and the lock control section 114 locks the shift operation member 14 when the shift operation member 14 rotates in the CW direction. Thus, the switching from the P range to the R range or the N range is prevented. When the shift operation member 14 is locked, the lock is released when the brake pedal 18 is operated after the shift operation member 14 is not operated.

As described above, the shift determination section 113 determines that the shift range of the selection position of the movement destination is selected when the shift operation member 14 maintains any one of the selection positions P1, P2, P3, P4, and P5 for more than the time T. For example, when the shift operation member 14 rotates from the selection position P5 to the selection position P3, the shift determination section 113 determines that the shift range switched by the driver is the N range. In the course of the movement, the shift operation member 14 passes through the selection position P4, but the shift determination section 113 does not determine that the D range is selected. The shift determination section 113 does not determine that the D range is selected when the shift operation member 14 stops at the selection position P4 for the time T or shorter, and determines that the D range is selected when the shift operation member stops at the selection position P4 for more than the time T.

The shift operation determination unit 110 counts the time during which the shift operation member 14 stops at the selection position P4 when the shift operation member 14 rotates in the CW direction from any one of the selection positions P1, P2, and P3. Here, when the shift operation member 14 moves from the selection position P4 to the selection position P5 before the time T elapses, the shift operation determination unit 110 locks the shift operation member 14 using the electromagnetic brake mechanism 50. In other words, the shift operation determination unit 110 determines such that the S range is not selected before determining that the D range is selected when the shift operation member 14 starts rotating to the selection position P5. Thus, when the driver mistakenly turns the shift operation member 14 too much in an attempt to switch from the P range, the R range, or the N range to the D range, the S range is not selected.

Since the S range is the shift range having a larger deceleration ratio than the D range, when the shift operation member is switched from the D range to the S range against the driver's intention while driving or starting, the automobile 1 may show a different behavior from the operation expected by the driver. When the shift operation determination unit 110 locks the shift operation member 14, it is possible to prevent the shift range from being switched to the S range against the driver's intention. When the shift operation member 14 is locked, the operation feeling of the shift operation member 14 clearly changes. For this reason, the driver can recognize, without looking at the screen or the like, that the shift operation member 14 is locked.

The above operation is also applicable when the automobile 1 has an L range or a B range instead of the S range.

When the shift operation member 14 rotates in the CW direction from any one of the selection positions P1, P2, and P3 and stops at the selection position P4 for more than the time T, the shift operation determination unit 110 determines that the D range is selected.

The display control section 116 causes a display (not shown), which is provided on the meter panel 12, to display various information regarding the operation state of the automobile 1. For example, the display control section 116 causes the display of the meter panel 12 to display the shift range of the transmission 4 or the information display portion 60 (FIG. 7) indicating the operating state of the shift operation member 14.

[4. State Transition of Shift Apparatus]

Figure 6:
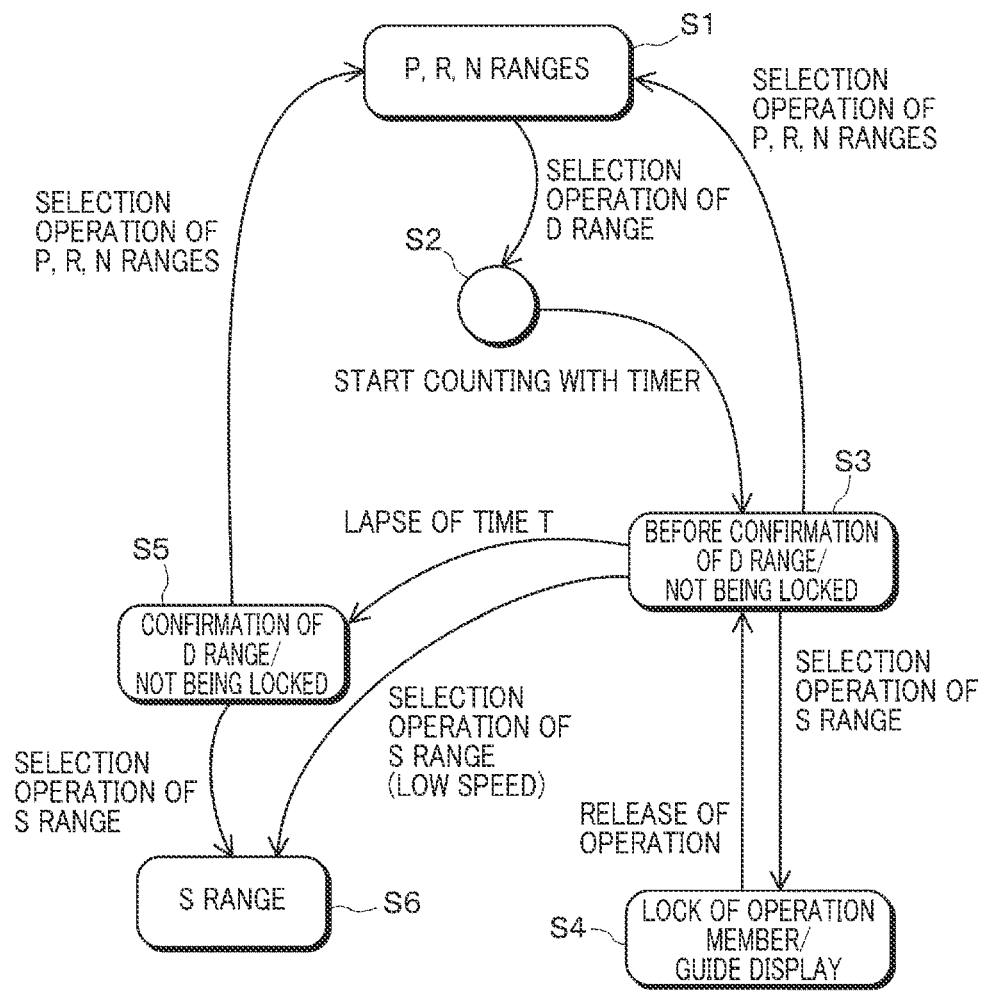
FIG. 6 is a state transition diagram of the automobile related to a shift operation.

FIG. 6 is a state transition diagram of the automobile 1 related to the shift operation, and shows the state transition of the shift apparatus 10 when the operation of switching the shift range to the D range is performed. In FIG. 6, a state S1 defines collectively a state in which the P range, R range, and N range are selected. In the state S1, the shift operation member 14 is at any of the selection positions P1, P2, and P3.

In the state S1, when the shift operation member 14 rotates to reach the selection position P4 from the operation of the driver, the shift apparatus 10 transitions to a state S2. In the state S2, the shift apparatus 10 starts counting the time during which the D range is maintained, and transitions to a state S3.

The state S3 means a state when the count start time in the state S2 is the time T or shorter. In the state S3, the rotation of the shift operation member 14 is not locked.

When it is determined in the state S3 that the shift operation member 14 rotates in the CW direction and leaves the selection position P4, the shift apparatus 10 moves to a state S4. The state S4 means a state in which the rotation of the shift operation member 14 is locked by the electromagnetic brake mechanism 50. In the state S4, when the operating force applied to the shift operation member 14 by the driver is released, the shift operation member 14 rotates in the CCW direction due to the action of the operation load generator 44, and the position of the shift operation member 14 returns to the selection position P4. The amount of rotation at this time is smaller than a distance between the selection position P4 and the selection position P5, but can be detected by the angle detector 31. The shift apparatus 10 returns to the state S3 and releases the lock of the shift operation member 14 when the return of the shift operation member 14 is detected.

In the state S4, when the shift operation member 14 is locked, the shift apparatus 10 displays, within a range visible to the driver, a guide indicating that the shift operation member 14 is locked. Here, an example of the display in the state S4 is shown in FIG. 7.

Figure 7:
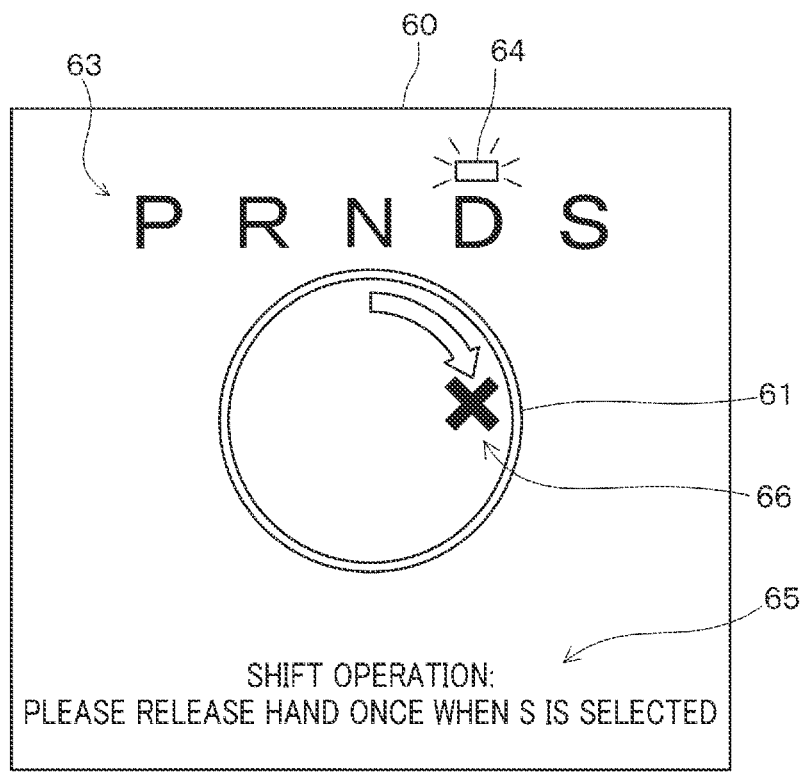
FIG. 7 is a diagram showing a display example of an information display portion.

FIG. 7 is a diagram showing a display example of the information display portion 60. The information display portion 60 is displayed on, for example, the display provided on the meter panel 12 under the control of the display control section 116.

On the information display portion 60, a dial image 61, a shift range display portion 63, and a shift indicator 64 are displayed. The dial image 61 is an image in imitation of the shift operation member 14. The shift range display portion 63 is an image showing the shift ranges that can be selected by the shift operation member 14 and arranged side by side. The shift indicator 64 is an image indicating a shift range currently selected from the shift ranges displayed on the shift range display portion 63. The shift indicator 64 may be an LED indicator attached to the display, or may be an image in imitation of the LED indicator.

In the state where the shift operation member 14 is not locked, the dial image 61, the shift range display portion 63, and the shift indicator 64 are displayed while the shift apparatus 10 is operating. The display control section 116 causes the information display portion 60 to display a guide display 65 and a guide display 66 when the shift operation member 14 is locked.

The guide display 65 guides the driver of the operation of the shift operation member 14 by characters. The example of FIG. 7 describes an operation method in a case where the driver desires to select the S range. The guide display 66 is an image arranged so as to be superimposed on the dial image 61, and graphically shows that the operation of the shift operation member 14 in the CW direction is restricted.

The display control section 116 causes the information display portion 60 to display the guide displays 65 and 66 to notify the driver a fact that the shift operation member 14 is locked and an operation method that the driver should perform.

In the state S3, when the time elapsed since the shift operation member 14 reaches the selection position P4 exceeds the time T, the shift apparatus 10 transitions to a state S5. The state S5 is a state in which the selection of the D range is confirmed. In the state S5, the shift operation member 14 can rotate in the CCW direction to select the P range, the R range, or the N range. In this case, the shift apparatus 10 transitions to the state S1. In the state S5, since the operation of rotating the shift operation member 14 in the CW direction is restricted, the operation of selecting the S range is possible. In this case, the shift apparatus 10 transitions to a state S6. The state S6 is a state in which the S range is selected.

In the state S3, even when moving in the CW direction, the shift operation member 14 may not be locked by the electromagnetic brake mechanism 50. The shift operation member 14 moves in the CW direction in the state S3 and the speed of movement, that is, the rotation speed is lower than a set speed, the shift apparatus 10 transitions to the state S6 to switch the shift range to the S range. When the shift operation member 14 is slowly operated, since the possibility of erroneous operation is low, the switching to the S range is performed according to the driver's intention.

Further, when the shift operation member 14 moves in the CCW direction in the S3, the switching of the shift range may be performed. In other words, in the state S3, the shift operation member 14 may be rotated in the CCW direction to enable an operation of selecting the P range, the R range, or the N range. In this case, the shift apparatus 10 switches the shift range in response to the operation of rotating the shift operation member 14 in the CCW direction, and transitions to the state S1.

In the state transition diagram of FIG. 6, the S range is not included in the state S1. This is because it is not highly possible that the driver mistakenly operates when the shift operation member 14 rotates in the CW direction after the shift range is switched from the S range to the D range by the operation of the shift operation member 14. However, even in such a case, the shift operation member 14 may be locked when the time to stay at the selection position P4 is the time T or shorter. In other words, S range may be included in the state S1. In this case, after the transition from the state S1 to the state S2, the operation is the same as described with reference to FIG. 6.

[5. Operation of Shift Apparatus]

Figure 8:
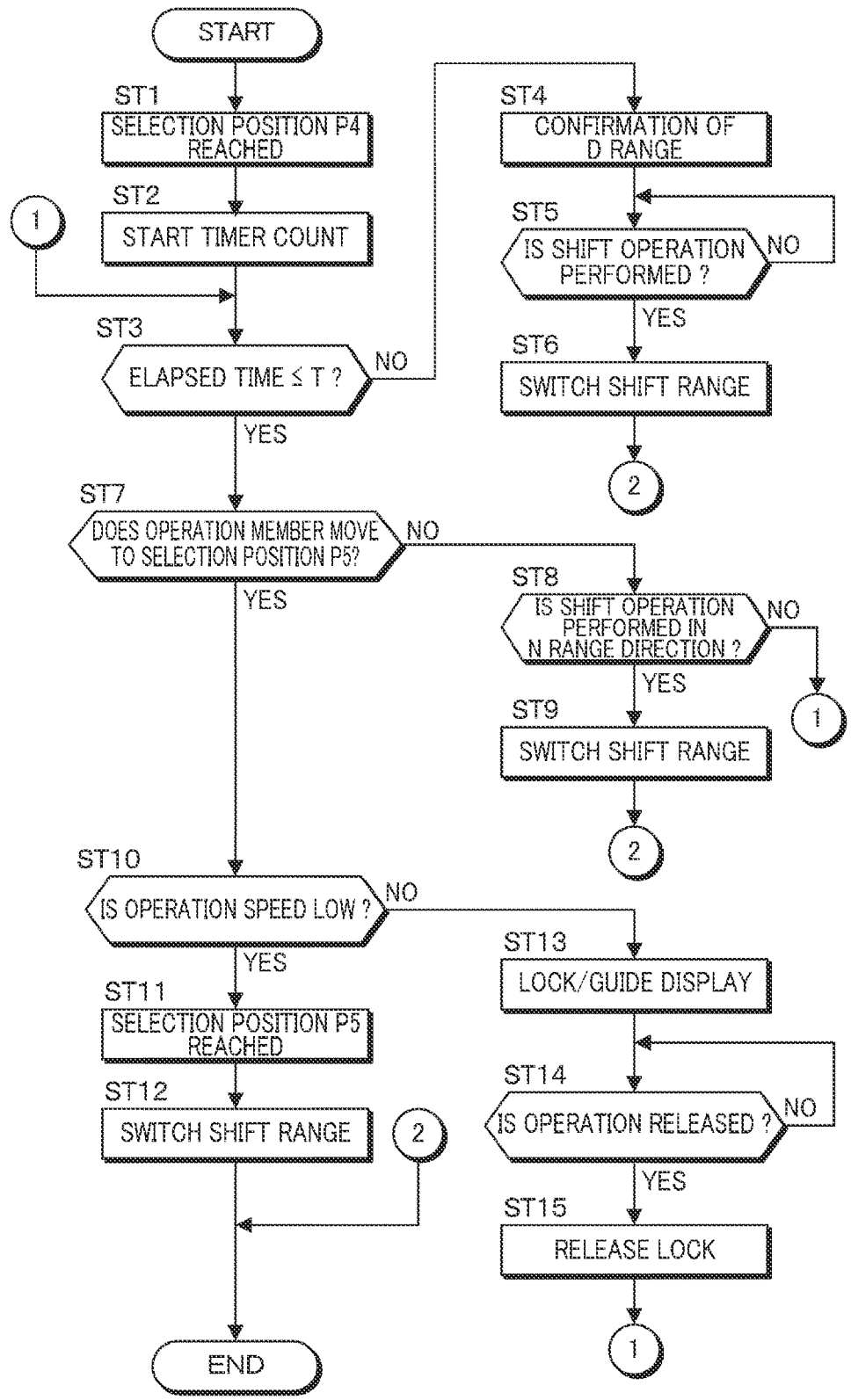
FIG. 8 is a flowchart showing an operation of the control unit.

An operation of the shift apparatus 10 will be described with reference to a flow chart. FIG. 8 is a flowchart showing an operation of the control unit 11, and is an example of realizing the state transition shown in FIG. 7. The operation of FIG. 8 is executed by the shift operation determination unit 110.

Specifically, operations of steps ST1 to ST5, ST8, and ST11 are executed by the shift determination section 113, and operations of steps ST7, ST10, ST14, and ST15 are executed by the lock control section 114. An operation of step ST13 is executed by the lock control section 114 and the display control section 116, and steps ST6, ST9, and ST12 are executed by the shift determination section 113 and the shift control section 103.

When detecting that the shift operation member 14 reaches the selection position P4 by the angle detector (step ST1), the shift operation determination unit 110 starts counting with a timer (step ST2).

The shift operation determination unit 110 determines whether the elapsed time being counted is equal to or shorter than the preset time T (step ST3). When the elapsed time exceeds the time T in step ST3 (NO in step ST3), the shift operation determination unit 110 transitions to the state S5, and confirms the D range as the shift range (step ST4). Thereafter, the shift operation determination unit 110 waits for the shift operation by the shift operation member 14 (step ST5). While the shift operation member 14 is not operated (NO in step ST5), the D range is maintained. When the shift operation member 14 is operated (YES in step ST5), the shift range is determined according to the operation, and the shift range of the transmission 4 is switched (step ST6).

When the elapsed time is equal to or shorter than the time T (YES in step ST3), the shift operation determination unit 110 maintains the state S3. In this case, the shift operation determination unit 110 determines, based on the detection result of the angle detector 31, whether the shift operation member 14 moves to the selection position P5 (step ST7). In other words, the shift operation determination unit 110 determines whether the position of the shift operation member 14 moves to a position closer to the selection position P5 than the selection position P4.

When the shift operation member 14 does not move toward the selection position P5 (NO in step ST7), the shift operation determination unit 110 determines whether the shift operation member 14 rotates in the CCW direction to perform the shift operation toward the N range (step ST8). Here, when the shift operation toward the N range is performed (YES in step ST8), the shift operation determination unit 110 determines the shift range according to the operation and switches the shift range of the transmission 4 (step ST9). When the shift operation toward the N range is not performed (NO in step ST8), the shift operation determination unit 110 returns to step ST3.

When it is determined that the shift operation member 14 moves toward the selection position P5 (YES in step ST7), the shift operation determination unit 110 determines whether an operation speed at which the shift operation member 14 rotates toward the selection position P5 is lower than the set speed (step ST10). The shift operation determination unit 110 calculates, for example, the amount of rotation per unit time based on the angle detected by the angle detector 31, and uses it as the operation speed. When the operation speed is lower than the set speed (YES in step ST10), the shift operation determination unit 110 switches the shift range of the transmission 4 to the S range (step ST12) when detecting that the shift operation member 14 reaches the selection position P5 (step ST11).

When the operation speed of the shift operation member 14 is not lower than the set speed (NO in step ST10), the shift operation determination unit 110 locks the shift operation member 14 using the electromagnetic brake mechanism 50, and performs the guide display shown in FIG. 7, for example (step ST13). The shift operation determination unit 110 determines whether the operation of the shift operation member 14 is released (step ST14), and waits while the operation is not released (NO in step ST14). When the shift operation member 14 rotates in the CCW direction and returns to the selection position P4, the shift operation determination unit 110 determines that the operation is released (YES in step ST14), releases the lock by the electromagnetic brake mechanism 50 (step ST15), and returns to step ST3.

[6. Summary]

As described above, the shift apparatus 10 according to the embodiment of the present invention is a shift apparatus 10 for the automobile 1 having the transmission 4 capable of switching a plurality of shift ranges including a first range, a second range, and a third range. The shift apparatus 10 includes: the shift operation member 14 rotatably attached to the automobile 1; the angle detector 31 configured to detect the position of the shift operation member 14 in the rotation direction; the shift determination section 113 configured to determine, based on the position of the shift operation member 14, the shift range selected by the shift operation member 14; and the lock control section 114 configured to regulate the rotation of the shift operation member 14. The lock control section 114 is configured to regulate the rotation of the shift operation member 14 when the shift operation member 14 moves to the selection position P4 (second position) corresponding to the D range (second range) from the selection position P1 (first position) corresponding to the P range (first range) or the selection position P5 (third position) corresponding to the S range (third range) and moves to the selection position P5 within a predetermined time after being located at the selection position P4. In other words, the lock control section 114 regulates the rotation of the shift operation member 14 when the operation position moving according to the operation of the shift operation member 14 moves to the selection position P5 and leaves the selection position P4 within a predetermined time after reaching the selection position P4.

According to such a configuration, when the operation of the shift operation member 14 is further performed within a predetermined time after the shift range of the automobile 1 is switched, the rotation of the shift operation member 14 is regulated. Thus, the operation of the shift operation member 14 can be restricted in order to prevent the switching of the shift range of the automobile 1 due to an erroneous operation. Further, the driver can easily recognize, by the lock of the shift operation member 14, that the switching of the shift range is restricted.

The shift determination section 113 determines that the selected shift range is the second range when the shift operation member 14 is continuously located at the selection position P4 for the predetermined time or longer, and the lock control section 114 enables the shift operation member 14 to rotate from the selection position P4 to the selection position P5 after determination that the shift operation member 14 moves to the selection position P4 and the second range is selected. Thus, since the shift operation is not hindered in a situation where the possibility of erroneous operation in the switching operation of the shift range is extremely low, deterioration of operability can be prevented.

The lock control section 114 does not regulate the rotation of the shift operation member 14 when the shift operation member 14 leaves the selection position P4 and moves to the selection position P5 within a predetermined time after the shift operation member 14 moves to the selection position P4 and a speed of the shift operation member 14 moving from the selection position P4 to the selection position P5 is lower than a set speed. According to such a configuration, when the shift operation member 14 is operated at a low speed, the shift operation is not hindered. Therefore, the operability is not deteriorated when the possibility of erroneous operation is extremely low.

The second range is a shift range in which a driving force in a forward direction of the automobile 1 is output, and the third range is a shift range in which a driving force in the forward direction of the automobile 1 is output at a higher deceleration ratio compared with the second range. According to such a configuration, since the switching to the shift range with a higher deceleration ratio is restricted within a predetermined time after the switching to the shift range in which the automobile 1 moves forward, the influence on the start and acceleration of the automobile 1 can be avoided when the shift operation is erroneous.

The shift operation determination apparatus further includes the brake operation detection section 112 configured to detect the operation of the brake pedal 18 of the automobile 1, wherein the lock control section 114 regulates the rotation of the shift operation member 14 from the selection position P1 to the selection position P4 when the braking operation is not detected in a state where the first range is selected, and regulates the rotation of the shift operation member 14 from the selection position P4 to the selection position P5 without regulating the rotation of the shift operation member 14 from the selection position P1 to the selection position P4 when the braking operation is detected in the state where the first range is selected. Specifically, the lock control section 114 locks the shift operation member 14 when the shift operation member 14 rotates in the CW direction from the P range in the case where the brake pedal 18 is not operated. When the brake pedal 18 is operated in the P range, the shift operation member 14 rotates, but is not locked. Here, when the shift operation member 14 is not locked in the P range, the lock control section 114 transitions to a state of locking the rotation of the shift operation member 14 from the D range to the S range. According to such a configuration, it is possible to regulate the switching of the shift range when the brake pedal 18 is not operated, and when the regulation is released, it is possible to quickly transition to the state of restricting the switching of the shift range due to an erroneous operation.

The shift operation member 14 is rotatable without a restriction on the amount of rotation in a state of not being regulated by the lock control section 114.
According to such a configuration, the shift operation member 14 is locked by the electromagnetic brake mechanism 50, and thus the driver can quickly recognize that the operation is restricted.

[7. Other Embodiments]

The present invention is not limited to the configuration of the above-described embodiment, and can be implemented in various aspects without departing from the gist thereof.

The display that displays the information display portion 60 is not limited to the meter panel 12, and may be provided on the instrument panel 19, for example. For example, when a car navigation device is installed on the instrument panel 19, the information display portion 60 may be displayed on a display of the car navigation device under the control of the display control section 116. In addition, an information display for displaying the operating state of the automobile 1 may be arranged separately from the meter panel 12 or the car navigation device, thereby displaying the information display portion 60.

In addition, the information display portion 60 may be configured to display information, for example, a traveling distance of the automobile 1, the remaining capacity of the battery 7, a drivable distance, and a fuel efficiency.

Further, for example, the operation unit 25 is not limited to the configuration shown in FIG. 4. The configuration of the angle detector 31 may be a rotary encoder or an optical sensor that detects the amount of rotation of the gear 43 or the shaft 14a of the shift operation member 14, or a detector having a gear that meshes with the gear 43. Alternatively, a detector may be used to magnetically detect a position of a magnetic body attached to the shift operation member 14. Further, the configuration for locking the rotation of the shift operation member 14 is not limited to the electromagnetic brake mechanism 50, and, for example, a pin that is fitted to the overdrive mechanism 46 to prevent the rotation of the overdrive mechanism 46 and an actuator that moves the pin. Alternatively, a motor may be used to apply a rotational force to the shift operation member 14 in a direction opposite to the operated direction.

In the above-described embodiment, the shift operation member 14 having the dial shape is illustrated, but the present invention is not limited thereto. The operation member may have a lever shape as long as being rotatably installed on the automobile 1 and being rotated by the driver to perform the shift operation. In the above-described embodiment, the control unit 11 includes the shift operation determination unit 110 together with the ECU 101, but the shift operation determination unit 110 may be configured independently of the ECU 101.

The present invention is applicable not only to the automobile 1 shown in FIG. 1, but also to all vehicles to be driven by an automatic transmission, for example, a freight vehicle, a large automobile, and a three-wheeled automobile.

The hardware configuration of the apparatus according to the present invention is not limited to the example of FIG. 5. Further, FIG. 8 shows the operation example in which the process procedure is divided into each step of the flowchart for convenience, and the operation of the apparatus according to the present invention is not limited to the order shown in FIG. 8.

REFERENCE SIGNS LIST

1 automobile (vehicle)
2 engine
3 motor generator
4 transmission (shift mechanism)
5 drive shaft
6 wheel
10 shift apparatus (shift operation determination apparatus)
11 control unit
12 meter panel
13 steering wheel
14 shift operation member (operation member)
17 accelerator pedal
18 brake pedal
19 instrument panel
22 range display portion
23 indicator
25 operation unit
31 angle detector (operation detection section)
32 vehicle speed sensor
33 accelerator pedal sensor
34 brake pedal sensor 36 obstacle sensor
41 case
44 operation load generator
46 overdrive mechanism
50 electromagnetic brake mechanism (regulation section)
60 information display portion
65, 66 guide display
101 ECU
103 shift control section
105 interface
110 shift operation determination unit
111 accelerator operation detection section
112 brake operation detection section (braking operation detection section)
113 shift determination section
114 lock control section (regulation section)
116 display control section

What is claimed is:

1. A shift operation determination apparatus for a vehicle having a shift mechanism capable of switching a plurality of shift ranges including a first range, a second range, and a third range, the shift operation determination apparatus comprising:
an operation member rotatably attached to the vehicle;
a position detection section configured to detect a position of the operation member in a rotation direction;
a shift determination section configured to determine, based on the position of the operation member, a shift range selected by the operation member; and
a regulation section configured to regulate a rotation of the operation member,
wherein
the regulation section being configured to regulate the rotation of the operation member when the operation member moves to a second position corresponding to the second range from a first position corresponding to the first range or a third position corresponding to the third range and moves to the third position within a predetermined time after being located at the second position,
the shift determination section determines that the selected shift range is the second range when the operation member is continuously located at the second position for the predetermined time or longer, and
the regulation section enables the operation member to rotate from the second position to the third position after determination that the operation member moves to the second position and the second range is selected.

2. The shift operation determination apparatus according to claim 1, wherein
the regulation section does not regulate the rotation of the operation member when the operation member leaves the second position and moves to the third position within a predetermined time after the operation member moves to the second position and a speed of the operation member moving from the second position to the third position is lower than a set speed.

3. The shift operation determination apparatus according to claim 1, wherein the second range is a shift range in which a driving force in a forward direction of the vehicle is output, and the third range is a shift range in which a driving force in the forward direction of the vehicle is output at a higher deceleration ratio compared with the second range.

4. The shift operation determination apparatus according to claim 3, further comprising:
a braking operation detection section configured to detect a braking operation of the vehicle, wherein
the regulation section regulates the rotation of the operation member from the first position to the second position when the braking operation is not detected in a state where the first range is selected, and regulates the rotation of the operation member from the second position to the third position without regulating the rotation of the operation member from the first position to the second position when the braking operation is detected in the state where the first range is selected.

5. The shift operation determination apparatus according to claim 1, wherein
the operation member is rotatable without a restriction on an amount of rotation in a state of not being regulated by the regulation section.

6. A shift apparatus for a vehicle having a shift mechanism capable of switching a plurality of shift ranges including a first range, a second range, and a third range, the shift apparatus comprising:
a shift operation determination apparatus configured to determine a shift range of the vehicle according to an operation; and
a shift control section configured to switch the shift range of the vehicle based on a determination result of the shift operation determination apparatus,
the shift operation determination apparatus including:
an operation member rotatably attached to the vehicle;
a position detection section configured to detect a position of the operation member in a rotation direction;
a shift determination section configured to determine, based on the position of the operation member, a shift range selected by the operation member; and
a regulation section configured to regulate a rotation of the operation member,
the regulation section being configured to regulate the rotation of the operation member when the operation member moves to a second position corresponding to the second range from a first position corresponding to the first range or a third position corresponding to the third range and moves to the third position within a predetermined time after being located at the second position,
the shift determination section determines that the selected shift range is the second range when the operation member is continuously located at the second position for the predetermined time or longer, and
the regulation section enables the operation member to rotate from the second position to the third position after determination that the operation member moves to the second position and the second range is selected.

* * * * *